United States Patent
Hashimoto

[11] Patent Number: 6,109,487
[45] Date of Patent: Aug. 29, 2000

[54] CONTAINER WITH DISPENSING ASSEMBLY

[75] Inventor: Masaya Hashimoto, Tokyo, Japan

[73] Assignee: Dart Industries Inc., Orlando, Fla.

[21] Appl. No.: 09/250,041

[22] Filed: Feb. 12, 1999

[51] Int. Cl.[7] .................................................. B67D 3/00
[52] U.S. Cl. ......................... 222/556; 222/109; 222/158; 222/189.06
[58] Field of Search .................................. 222/109, 158, 222/189.06, 546, 556, 570

[56] References Cited

U.S. PATENT DOCUMENTS

| | | | |
|---|---|---|---|
| D. 167,580 | 8/1952 | McFarland | D44/29 |
| D. 344,686 | 3/1994 | Weterrings | D10/46.2 |
| D. 364,075 | 11/1995 | Brogren | D7/653 |
| D. 394,014 | 5/1998 | Laib | D10/46.2 |
| 3,013,436 | 12/1961 | Dailey | 73/426 |
| 3,208,650 | 9/1965 | La Ham | 222/570 |
| 3,512,681 | 5/1970 | Frankel | 222/158 |
| 5,320,232 | 6/1994 | Maguire et al. | 215/245 |
| 5,322,196 | 6/1994 | Burton | 222/109 |
| 5,347,865 | 9/1994 | Mulry et al. | 73/427 |
| 5,472,121 | 12/1995 | Silano | 222/158 |
| 5,551,607 | 9/1996 | DeJonge, Sr. et al. | 222/505 |
| 5,632,417 | 5/1997 | Robbins, III et al. | 222/158 |
| 5,667,106 | 9/1997 | Robbins, III | 222/158 |
| 5,893,489 | 4/1999 | Giarrante | 222/556 |

FOREIGN PATENT DOCUMENTS

| | | |
|---|---|---|
| 56-163975 | 12/1981 | Japan . |
| 57-129124 | 8/1982 | Japan . |
| 58-84529 | 6/1983 | Japan . |
| 59-4442 | 1/1984 | Japan . |
| 59-185626 | 12/1984 | Japan . |
| 61-149831 | 9/1986 | Japan . |
| 706364 | 5/1987 | Japan . |
| 2-20117 | 2/1990 | Japan . |
| 3-93731 | 9/1991 | Japan . |
| 841586 | 7/1992 | Japan . |
| 898228 | 5/1994 | Japan . |
| 6-84313 | 12/1994 | Japan . |

*Primary Examiner*—Joseph A. Kaufman
*Attorney, Agent, or Firm*—Taylor J. Ross

[57] ABSTRACT

A dispensing container including an oblong container body with a removable seal engaged thereto and having a discharge spout selectively closed by a cap pivotally mounted to the seal by a connecting strap with an offset central portion. The connecting strap has an outer end releasably pivotally joined to the seal with the cap, upon complete removal from the seal, defining a measuring cup horizontally positionable on a flat surface by an intermediate offset formed within the connecting strap.

3 Claims, 3 Drawing Sheets

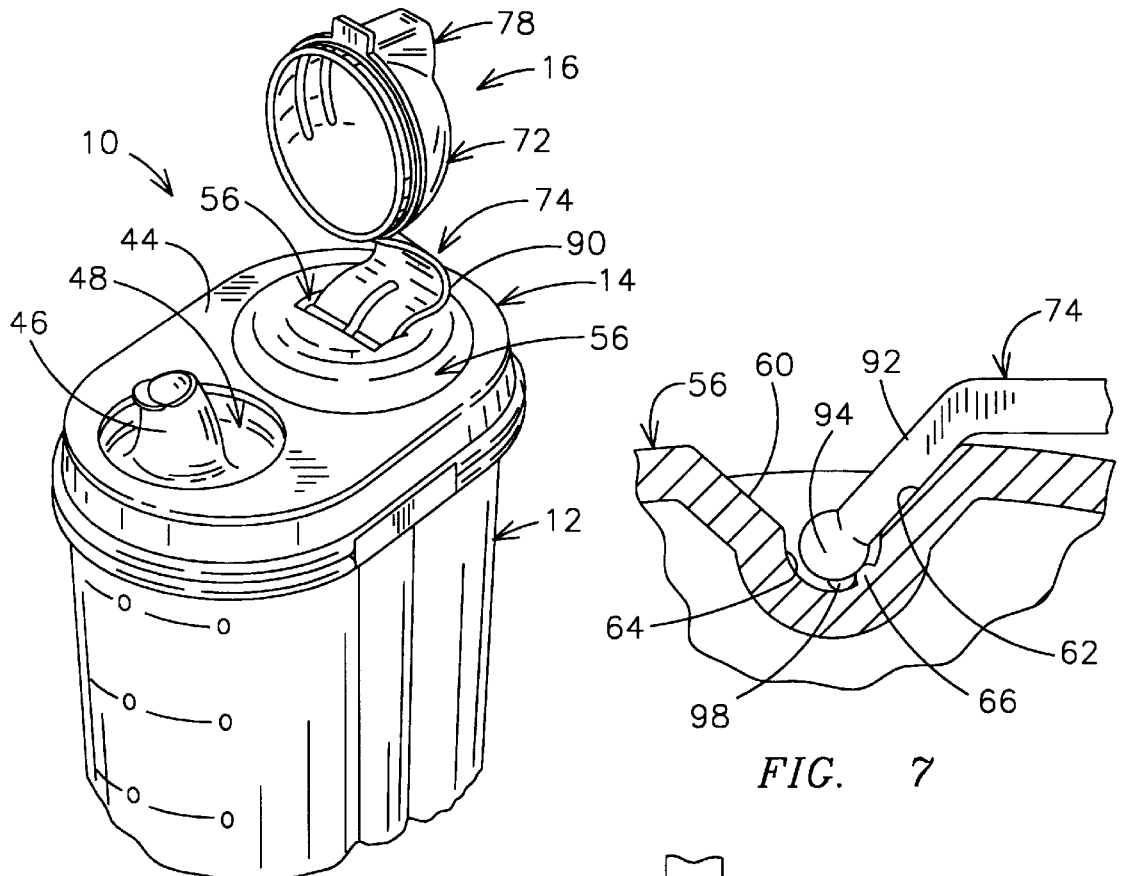
FIG. 6
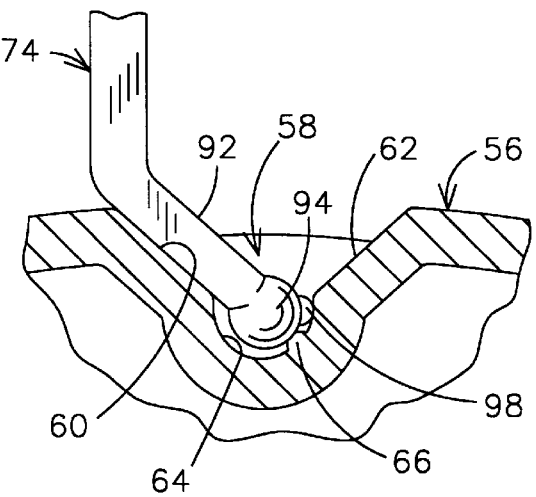
FIG. 7
FIG. 8
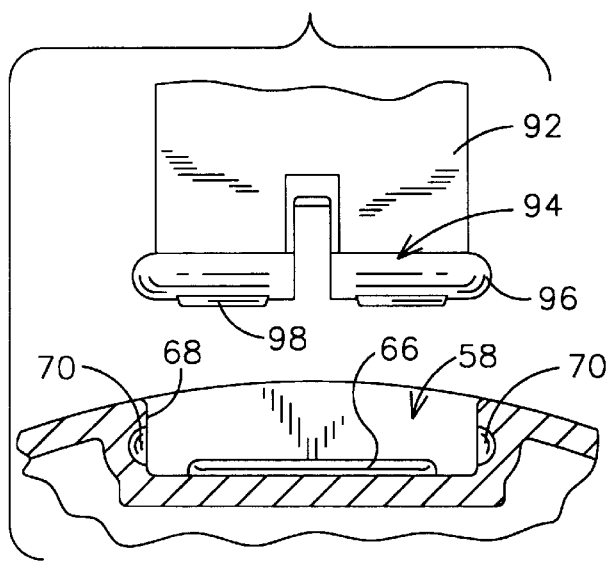
FIG. 9

6,109,487

1

CONTAINER WITH DISPENSING ASSEMBLY

BACKGROUND OF THE INVENTION

The invention is broadly concerned with containers wherein the container body has the open mouth thereof closed by a removable lid or seal having an outlet therein for the restricted dispensing of the container contents. The outlet is in turn closed by an appropriate tethered cap.

While such dispensing containers are generally known, problems are frequently encountered in those situations wherein a measured dispensing is to be achieved such as in the mixing of liquid seasonings, for example soy sauce, sweet sake, Japanese vinegar and Japanese noodle sauce, to arrive at the desired flavorings. An exact measuring and control of the dispensed product will usually require the use of separately provided accessories such as measuring cups and strainers. This in turn requires the ready availability of such items whenever the contents are to be dispensed.

SUMMARY OF THE INVENTION

The dispensing container of the present invention, while useable as a general purpose container, is particularly intended for use in providing for a measuring dispensing and filtering of the contents in a simple and effective manner without requiring external accessories.

In achieving the goals of the invention, it is particularly significant that the cap have dual functions, (1) providing a closure which can be a releasably retained in each of a closed position and an open position, and (2) functioning as a measuring cup or spoon separable from the container seal to provide a level measuring chamber with graduations thereon.

The cap itself defines an enlarged downwardly opening generally dome shaped chamber with a forwardly enlarged recess which cooperates with the chamber in accommodating an upwardly and forwardly arcing spout, with pouring lip, defining the seal outlet. The seal, immediately inward of the spout, is provided with a mounting collar surrounding the outlet and removably receiving a snap-in filter or strainer which restricts the passage of solids greater than a predetermined size through the spout.

The cap mounts to the container by an elongate mounting strap or tether with a remote bifurcated end for a selective inwardly flexing of the formed legs toward each other for engaging and disengaging cooperating components on the strap and seal whereby removal of the cap can be easily effected.

The connecting strap has an offset portion therein which acts as an abutment to define the open position of the cap. Cooperation between the strap end and the seal recess receiving the strap end provides for a releasable fixing or retention of the cap in the open position.

The chamber defined within the cap is of a size which enables the cap, upon removal and inversion, to function as a measuring cup. This use is facilitated by the provision of graduations on the cup and the formation of the connecting strap offset so as to extend into a common plane with the top of the domed configuration which defines the cap. The upper surface of that portion forming the dome recess is also in this plane and provides a horizontal support base when the cap is in its measuring cup position with the open mouth of the cup upwardly opening in a parallel plane with the surface upon which the cup sits.

The container body, upon which the seal and cap mount, is of an oblong configuration in cross-section and includes,

2 vertically along the sides thereof, central ribs which, in conjunction with the oblong configuration, provide a container which can be much more conveniently held as opposed to a more conventional cylindrical container.

Other features and details of significance will become apparent from the following more specific discussion of the invention.

BRIEF DESCRIPTION OF THE DRAWINGS

FIG. 6 is a perspective view of the upper portion of the dispenser with the cap open;

FIG. 7 is an enlarged sectional detail illustrating the cooperative retention means between the connecting strap and the seal for retention of the cap and its open position;

FIG. 8 is a cross-sectional detail similar to FIG. 7 and indicating the relationship of the connecting strap and the seal with cap in its closed position; and FIG. 9 is an enlarged exploded detail illustrating the relationship between the hinge components on the remote end of the strap and within a recess defined in the seal.

DESCRIPTION OF PREFERRED EMBODIMENT

Figure 1:
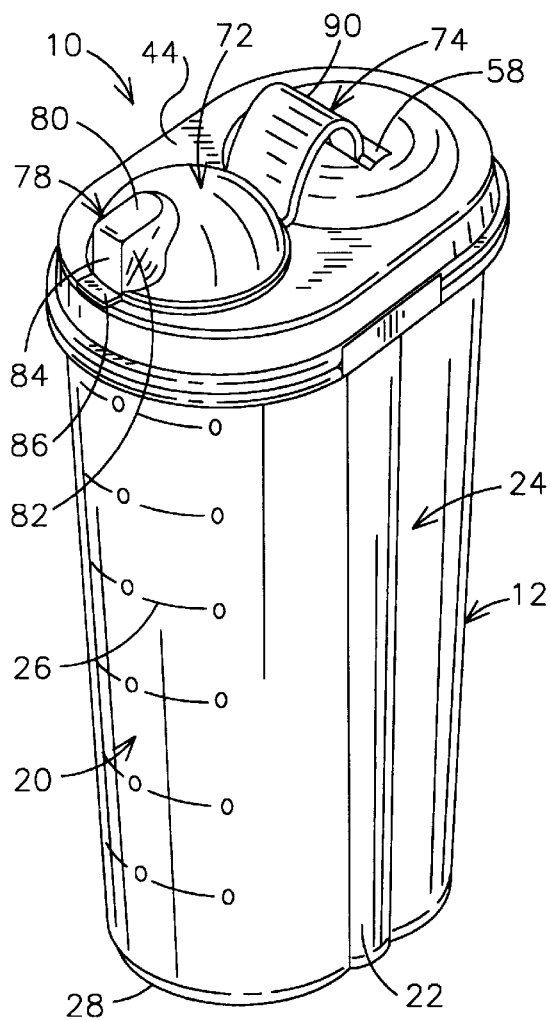
FIG. 1 is a perspective view of the dispenser with the seal and closed cap thereon.

Referring now more specifically to the drawings, the dispenser or container 10 comprises three basic components, a vertically elongate container body 12, a seal 14 and a cap unit 16. As desired, a small cup-like strainer or filter 18 can also be utilized.

Figure 2:
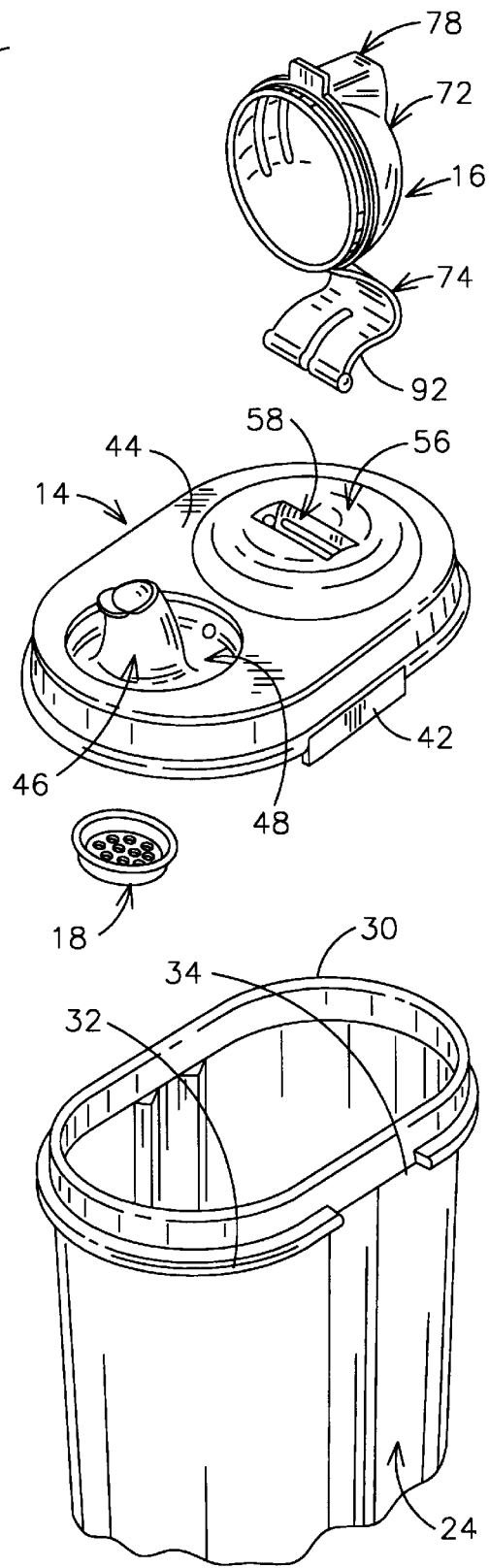
FIG. 2 is an exploded perspective view of the various components of the dispenser.

The container body 12, defining an enlarged internal storage chamber for the foodstuff to be dispensed, will be of an oblong configuration with arcuate end walls 20, the generally circular arcs of which terminate at central vertical ribs 22 formed within the opposed side walls 24. The container body 12, thus formed, can be easily grasped in one hand for a selective dispensing or pouring of the contents. It is preferred that the container body have measuring indicia 26 on one of the arcuate or semi-circular end walls 20. Further, as desired, the container body 12 can taper sightly from the base or bottom 28 thereof to a relatively wider open upper mouth defined by a rim portion 30. An outwardly projecting support shoulder 32 is integral with the container body peripherally thereabout and at an elevation between the rim portion 30 and the major portion of the container body therebelow. The rim portion 30 above the shoulder 32 is formed with an uninterrupted oval wall, that is the side gripping ribs 22 of the container body do not extend into the rim portion 30, thus facilitating a sealing engagement of the seal 14 thereto as shall be explained presently. Noting FIG. 2 in particular, the shoulder 32 is interrupted or has a gap 34 therein centrally along one or both of the side walls 24.

The seal 14, also of an oblong circular configuration, conforms to the mouth of the container body 12 defined by the rim portion 30. The seal 14 includes a peripheral downwardly directed groove 36, defined by depending outer and inner flanges 38 and 40, which frictionally receives the container body rim portion 30 therein in a manner as to achieve a positive seal. As desired, the outer flange 38, on the inner surface thereof, may be slightly undercut, and the outer face of the rim portion may be slightly bulbous to enhance both the seal and frictional engagement between the seal 14 and the rim portion 30. With the seal fully mounted, the outer flange 38, normally with a small outwardly directed rigidifying bead thereon, seats closely on the container body shoulder 32.

It is intended that the seal 14 be selectively removable both for a filling of the container body 12 and a cleaning thereof. Accordingly, the outer seal flange 38 has, integral therewith, an elongate slightly depending lip portion 42 which aligns with and is received within each of the shoulder gaps 34 for easy access thereto as a means for upwardly peeling of the seal 14 from the rim portion 30. As will be appreciated, the food compatible synthetic resinous materials from which the container and seal are formed incorporate a sufficient degree of flexible resiliency or elasticity as to allow for the snap mounting of the seal to the container body and the selective removal therefrom.

The seal 14 includes a flat top panel 44 with an outlet in a form of a discharge spout 46 within and extending upward from the bottom of a circular drip well 48 defined in the top panel 44 adjacent one of the arcuate container body end walls 20, preferably that which includes the measuring indicia 26. The well 48, noting FIGS. 4 and 5 in particular, will also preferably include a return port 50 whereby any spillage will automatically return to the internal chamber within the container body 12.

The spout 46, extending an appreciable distance above the top panel 44, arcs slightly forwardly toward the corresponding end wall 20 and includes a forward lip portion 52 which is intended to minimize drippage.

Figure 4:
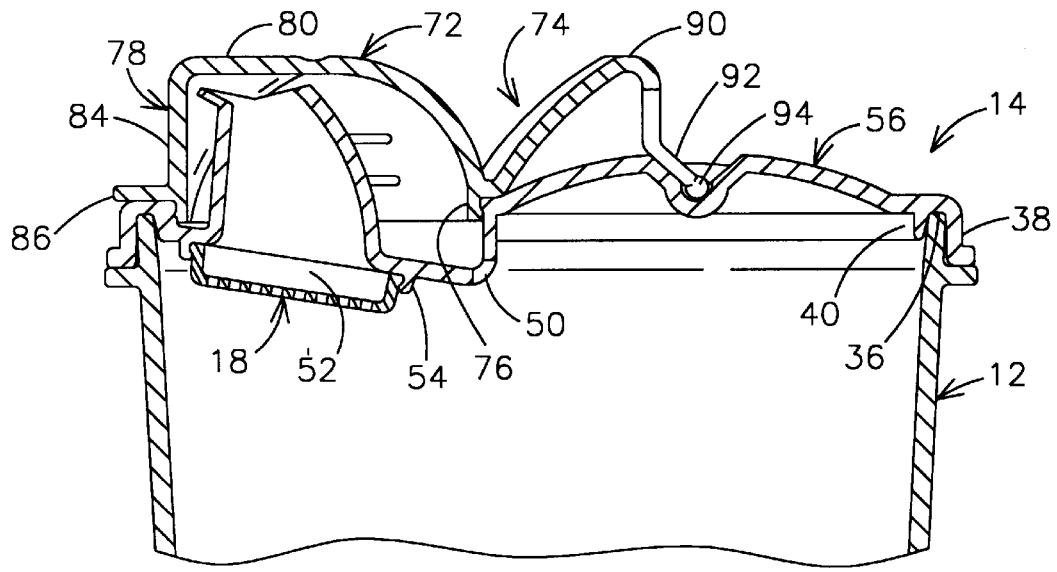
FIG. 4 is a enlarged cross-sectional detail through the seal with the cap in a closed position over the outlet spout.

Noting the cross-sectional details of FIGS. 4 and 5 in particular, provision can be made for a mounting of the cup-shaped strainer 18 to the bottom wall of the well 48 immediately below and in alignment with the spout 46. The strainer, in addition to having a perforated bottom panel, includes a peripheral upstanding wall 52 with an outer gripping bead about the upper edge thereof which snap fits immediately above an inwardly directed gripping bead formed on an integral depending circular retaining flange 54 depending from the bottom panel of the spout well 48. The inherent flexibility of the material from which the seal 14 is formed, and also possibly the strainer 18, allows for a ready snap-removal and engagement of the strainer.

The top panel 44 of the seal 14 includes a low dome or dome portion 56 formed therein longitudinally spaced from the spout well 48 adjacent the second arcuate end of the seal 14. The dome has a central elongate recess 58 formed therein transversely of the length of the seal 14 with inwardly inclined front and rear walls 60 and 62 terminating in a semi-cylindrical inner recess base or pocket 64 with a longitudinally extending limiting bump 66 projecting generally radially inward at a point generally closer to the rear recess inclined wall 62. The recess 58 includes opposed substantially vertical end walls 68 with a pair of inwardly opening aligned sockets 70 formed therein, one in each of the end wall 68 at a point slightly elevated relative to the semi-cylindrical base recess or pocket 64.

The cap unit 16 includes a dome-shaped cap 72 and a substantially rigid wide connecting strap 74. The cap 72 includes a lower circular peripheral edge portion 76 which is closely received within the circular upper portion of the spout well 48 and is releasably snap-locked therein by cooperating sealing ribs or beads on the external surface of the cap rim portion 76 and inwardly extending about the mouth or upper edge portion of the well 48. This relationship will be best seen in the cross-sectional view of FIG. 4 and is intended to form a positive sealing between the cap 72 and the seal 14 with any accidental leakage from the spout 46 merely draining back into the container body through the port 50 which is positioned at a low point within the well.

In order to accommodate the forwardly arcing spout 46 with the drip-reducing forwardly directed lip 52 thereon, the interior chamber of the cap 72 includes a forward extension area of a transverse width and forward extension sufficient to accommodate the spout 46 with the cap 72 closed thereover. This chamber extension is accommodated by a radial enlargement 78 of the dome with the enlargement including a planar top wall portion 80 coplanar with the outermost wall portion or apex of the dome forming the basic structure of the cap 72, opposed side walls 82 and a front wall 84. The front wall 84 is coextensive with the rim portion 76 about the open mouth of the cap 72. In order to selectively release the cap 72 from its sealed position, an integral forwardly extending lip 86 is provided at the base of the front wall 84 of the extension 78 and so positioned as to engage on the upper surface of the top seal panel 44 and project slightly beyond the outer seal flange 38 for ready access thereto.

Figure 5:
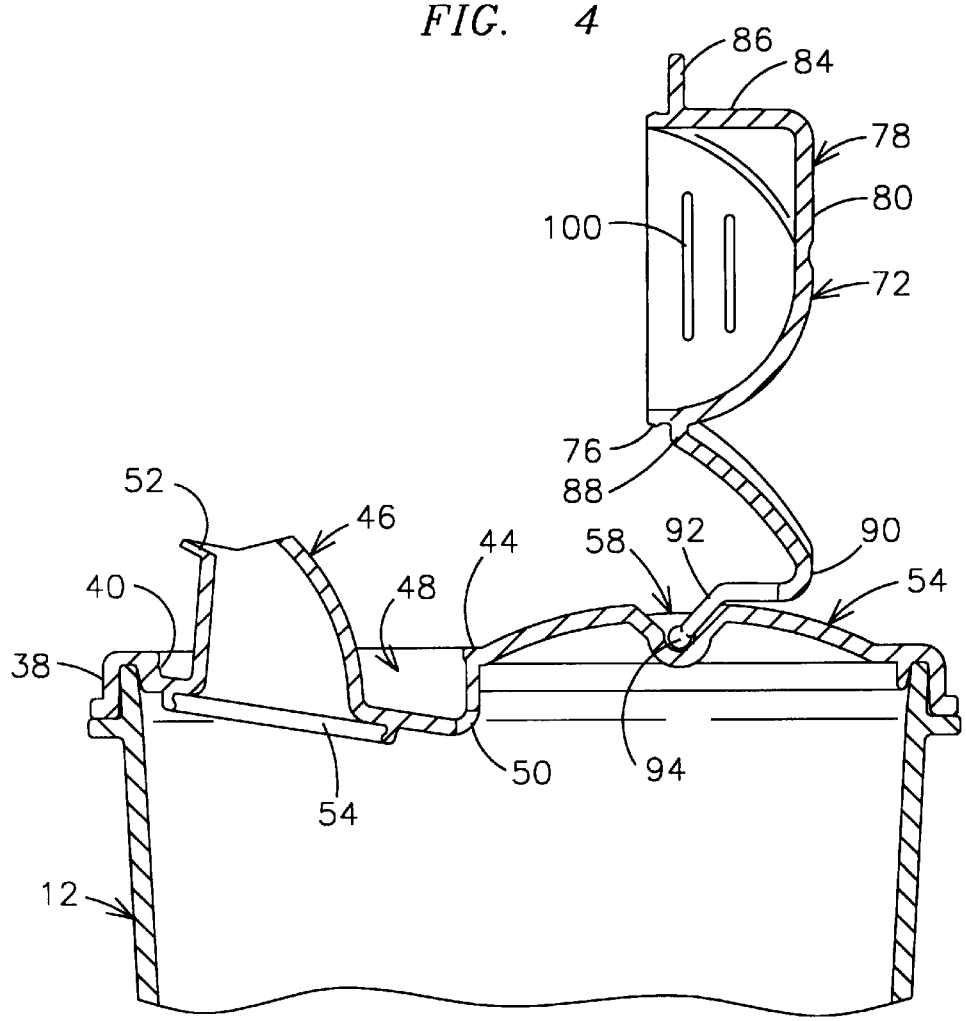
FIG. 5 is a cross-sectional view similar to FIG. 4 with the cap in its opened position.

It is significant that provision be made to tether or secure the cap 72 to the seal and the container, particularly in the open position of the cap, as illustrated in FIG. 5, when dispensing. Accordingly, the wide connecting strap 74 is fixed, and preferably integrally formed, at the inner end 88 thereof with the domed cap diametrically opposed from the lifting lip 86 and immediately adjacent the outer rim portion 76, spaced therefrom only sufficient as to allow for the snap interlocking of the closed cap within the rim portion of the seal well 48. With the cap closed, the strap 74 angles upwardly and laterally outwardly from the inner end 88 thereof to a point or apex 90 which is in the plane of the apex of the dome portion of the cup 72 and the top wall 80 of the extension. From this point, the connecting strap is reversely curved and extends generally perpendicular to the plane of the apex 90 to a point slightly below mid height on the domed portion of the cup 72, and from there angles outwardly and downwardly to define a straight outer end portion 92 which terminates in a free bulbous outer end 94 remote from the integral inner end 88 of the strap 74. The transverse width of the strap 74 at the bulbous end 94 thereof is substantially equal to the length of the seal recess 58 with the bulbous end 94 of the strap including projecting stubs 96 on the opposed outer ends thereof which in turn are rotatably received within the opposed end sockets 70 of the seal recess 58. In order to enable an effective introduction and removal of the outer and end portion of the connecting strap into and from the seal recess 58, the strap is bifurcated through and inward of the beaded outer end thereof, allowing for a slight lateral compression of the two formed strap legs toward each other to align the bead extensions with the sockets.

Noting FIGS. 7 and 8 in particular, the outer end portion 92 of the strap 74 is so angled relative to the strap portion immediately inward thereof, as to form an abutment which will lie flat against the rear face 62 of the seal recess 58 when the cap is at its full open position rearward of the discharge spout 46 and generally extending vertically from the seal. In the closed position of the cap, the outer end portion 92 of the connecting strap 74 will seat similarly against the inclined forward face 60 of the seal recess 58, at which point the cap itself is sealed to and within the spout well.

The beaded outer end of the connecting strap, which in effect defines a first hinge component with the seal recess 58 and sockets 70 defining the companion hinge component, includes a radially extending protuberance 98 thereon and therealong. The protuberance 98, in light of the bifurcation of the outer end portion of the strap 74, can actually be formed in two aligned sections. This protuberance, noting FIGS. 7 and 8 in particular, is so oriented relative to the limiting bump 66 formed in the base portion 64 of the recess 58 as to cooperate with the limiting bump 66 and retain the connecting strap, and hence the cap, in both its closed position and its open position until manually released. In other words, in light of the inherent flexible resiliency of the material of the cap and seal, a continuous manual pressure on the cap and connecting strap to pivot the cap from one position to the other, will cause the protuberance 98 to ride over the limiting bump 66 and, in effect, snap into position either forwardly or rearwardly thereof. This is particularly significant in the open position of the cap to retain the cap as the contents are poured and without the necessity of separately holding the cap open.

Figure 3:
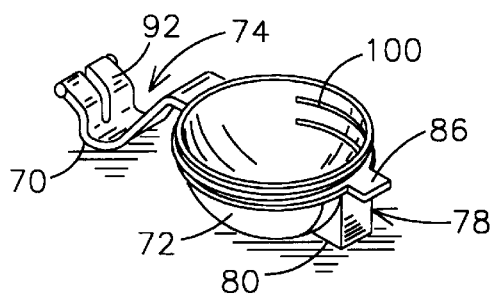
FIG. 3 is a perspective view of the cap removed from the seal and positioned for use as a measuring cup.

One of the principal features of the invention is the adaptability of the cap for use as a measuring cup for a more exact dispensing of the contents of the container body and without requiring the presence of a separate implement. Thus, several of the previously described features of the cap and connecting strap are of particular significance, including the bifurcation of the outer mounting end portion of the connecting strap to allow for a simplified complete release of the cap and strap from the seal, while at the same time maintaining a positive pivotal engagement between the strap and seal until the strap is intentionally released. Also of particular significance, noting FIG. 3, is the central offset in the connecting strap 74 which positions the apex 90 thereof in a common plane with the apex of the domed cup and the planar top wall 80 of the extension 78. This relationship ensures a horizontal support of the cup on any appropriate flat horizontal surface, such as a countertop, table top, or the like. It will of course be recognized that the plane of the mouth of the chamber of the cap parallels the support plane as preferred in a conventional measuring cup. This horizontal positioning of the formed cup is significant in allowing for an appropriate measuring of the contents thereof, such measuring being facilitated by the provision of measuring graduations 100 about the interior of the chamber of the cup defined by the inverted cap. The connecting strap 74 itself, particularly with the upwardly directed laterally outwardly angled strap end portion 92, formed upon an inverting of the cap, provides a highly effective handle and hand grip portion for the cap with the free beaded end of the strap generally in the plane of the mouth of the cup and with the connecting strap having sufficient rigidity as to easily allow for the handling of a filled cup. Such rigidity can be enhanced by a slight transverse arcing of the strap. As will be appreciated, the level supporting of the cup avoids the necessity of a continuous holding of the cup as the contents are poured therein and, possibly, temporarily stored therein. After use of the cap as a measuring cup, the empty cap can then be easily remounted to the seal and closed over the spout, with any residue that might remain within the chamber of the cap, freely draining back into the container body.

The foregoing is illustrative of the invention, and while a single embodiment has been disclosed, it is contemplated that all embodiments as may fall within the scope of the claims following hereinafter, are to be considered as encompassed by the invention.

What is claimed is:

1. A container with dispensing assembly, comprising a container for storing a pourable material, said container including a pour spout through which said pourable material will flow, and a cap, said cap defining a chamber with indicia indicating volumes within said chamber, a mouth surrounding said chamber, and an outer wall portion opposed to said mouth, said cap being removably mounted to said container with said chamber in covering relation to said pour spout and removable for inversion to receive a portion of said material, the improvement comprising:

a strap extending from said cap to an outer end, said outer end being removably mounted to said container, and said strap having a lateral offset between said cap and said outer end, said lateral offset extending to a common plane with said outer plane defined by said outer wall portion of said cap, whereby said cap, when inverted, will rest upon said offset portion and said outer plane with said mouth substantially horizontal.

2. A container as in claim 1, wherein said outer end of said strap is pivotally mounted to said container, such that said cap and strap will pivot between a first position with said chamber in covering relation to said pour spout, and a second position with said cap spaced from said pour spout, and wherein said strap includes an outer end portion between said lateral offset and said outer end, said outer end portion forming an abutment engageable with said container when in said second position.

3. A container as in claim 2, wherein said container includes a body having a side wall extending to a rim portion, and a seal mounted to said rim portion, said seal including said pour spout and removably and pivotally mounting said strap.

* * * * *